Patented Jan. 26, 1954

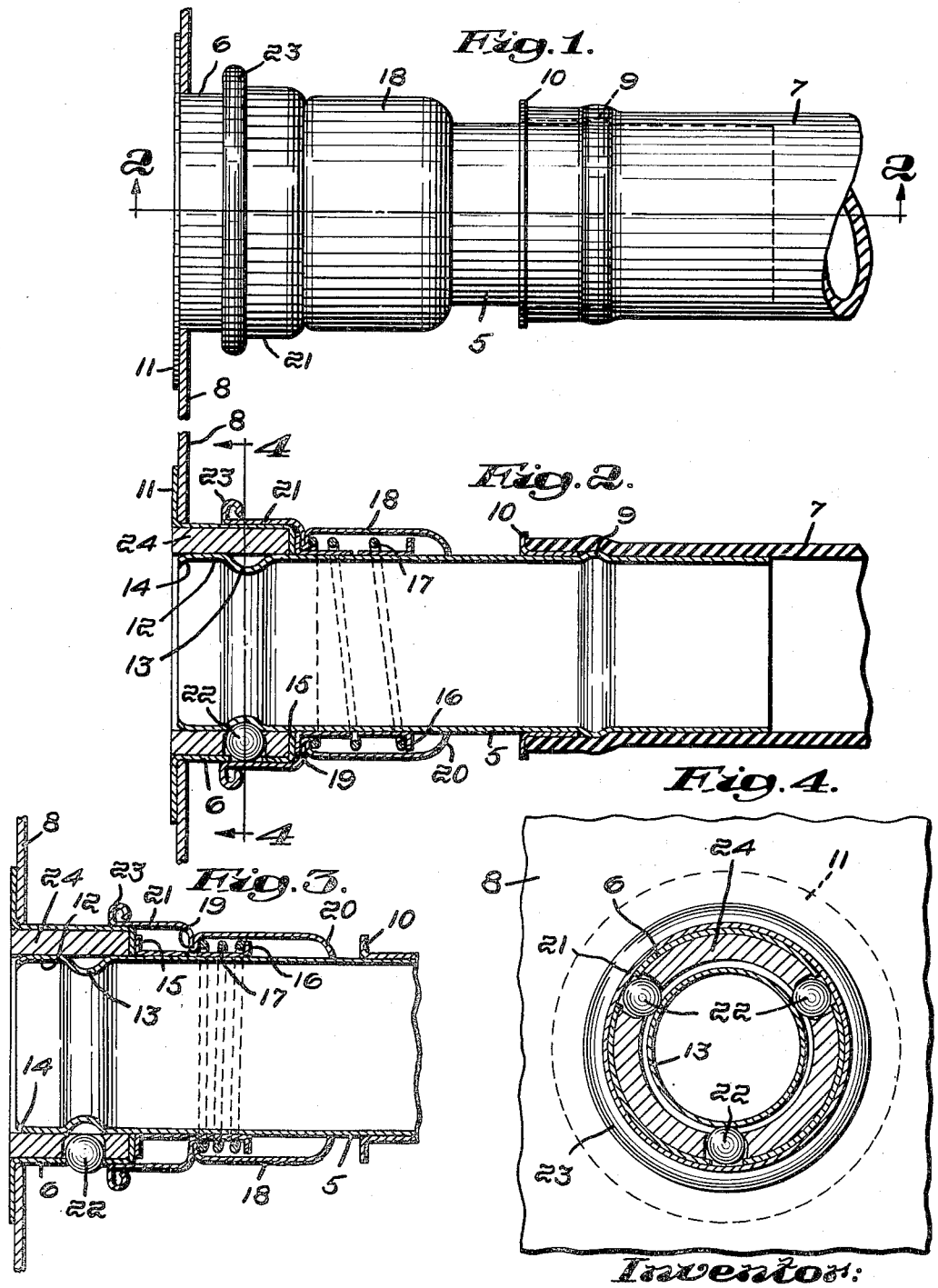

2,667,371

UNITED STATES PATENT OFFICE 2,667,371

COUPLING FOR CONDUIT PARTS

Paul C. Holte, Canton, Mass., assignor to Pullman Vacuum Cleaner Corporation, Boston, Mass., a corporation of Massachusetts Application June 13, 1950, Serial No. 167,765

4 Claims. (Cl. 285—168)

My present invention relates to couplings and particularly to couplings for use in detachably connecting such conduit parts as, for example, vacuum cleaners and their hoses.

While other uses of couplings in accordance with my invention will suggest themselves, particular reference is made to their use in connection with vacuum cleaners where there has long been a demand for a tight coupling, the parts of which may be pushed together to connect the parts effectively, and which is adapted to withstand the substantial strains that result even from the normal use of a vacuum cleaner and, at the same time, is capable of being quickly and easily released.

In accordance with my invention, I provide couplings which meet those generally indicated requirements. Each of my couplings consists of first and second tubular members. The first member has a head dimensioned to fit freely within the mouth of the second member and has an annular groove. A sleeve, which includes an annular locking flange, is resiliently connected to the first member to slide rearwardly from a position in which its locking flange is operative. The second member has a plurality of locking elements movable from a first position in which they are spaced apart to receive the head into a second position in which they are entrant of the annular groove of the head. When the locking elements enter that groove and the locking flange is in its operative position, the locking flange holds the locking elements securely against movement into their first position to effect a secure coupling between the members while enabling them to be easily pulled apart simply by withdrawing the locking flange from its operative position.

In practice, the locking members are wedged into their first position by the head as it enters the second member and in their first position, the locking members are exposed to be engaged by the locking flange. Thus, as the first and second members are pushed together, the sleeve is readily forced rearwardly until the locking members may enter the annular head groove to enable the resilient connection between the sleeve and the first member to be effective to seat the locking members in that groove and to return the locking flange to its operative position in which the locking members are held seated in the head groove. While the first and second members may be coupled tightly together simply by pushing them together, they can not be pulled apart until the sleeve is manually retracted to position the locking flange inoperatively.

In the accompanying drawings, I have shown an illustrative embodiment of my invention from which these and other of its novel features and advantages will be readily apparent.

In the drawings:

Fig. 1 is a view, in elevation, of a coupling in accordance with my invention,

Fig. 2 is a section along the lines 2—2 of Fig. 1,

Fig. 3 is a similar fragmentary section showing the sleeve retracted, and

Fig. 4 is a section along the lines 4—4 of Fig. 2.

In the drawings, I have indicated generally at 5 and 6 the tubular members by which the suction or vacuum hose 7 is connected to the vacuum cleaner, indicated at 8. In the illustrative embodiment of my invention, the hose 7 is connected to the member 5 which has a hose retaining bead 9 and a flange 10 against which the attached end of the hose 7 is seated, while the member 6 has a flange 11 by which it is secured to the vacuum cleaner 8.

I provide the member 5 with a head 12 dimensioned to fit freely within the member 6 and having an annular groove 13 and an inwardly curved extremity 14 to facilitate its entrance into the member 6. Fast on the member 5 are a pair of spaced retainers 15 and 16 for the spring 17.

A sleeve 18 is shown as having spaced shoulders 19 and 20 and a forwardly disposed, annular, locking flange 21. The shoulder 19 is engaged by the spring 17 to be yieldably seated thereby against the retainer 15 which functions as a stop to establish an operative position for the locking flange 21.

The member 6 has a plurality of locking elements 22 movable between a first position in which they are spaced apart to receive the head 12 and a second position in which the elements 22 are entrant of the groove 13 and when the elements 22 are thus located and the locking flange 21 is in its operative position, the elements 22 are locked to securely interconnect the members 5 and 6. The members 5 and 6 may be easily disconnected simply by drawing back the sleeve 18 against the action of the spring 17 to release the locking elements 22 so that they may return into their first position as the members 5 and 6 are pulled apart.

The members 5 and 6 may be as easily interconnected as with the sleeve 18 held back to position the locking flange 21 inoperatively, the head 12 may be readily inserted into the member 6 to carry the locking members 22 into their first position until they enter the groove 13. When the sleeve 18 is released, the locking flange 21 is returned by the spring 17 to hold the elements 22 in the groove 13. As will be apparent from Figs. 2 and 3, the locking flange 21 terminates in a bead 23 which functions to force the locking members 22 inwardly.

It will be appreciated from the drawings that one of the important features of my invention is that it provides a coupling that becomes positively locked simply by pushing the members 5 and 6 together. To accomplish that result, I provide that the locking members 22 are forced into and held in their first position by the head 12 until they may enter the head groove 13 and in that first position, the locking members 22 are exposed to be engaged by the locking flange 21 so that as the members 5 and 6 are pushed together, the sleeve 18 is forced rearwardly until the locking member 22 may enter the groove 13 when the spring 17 becomes effective to drive the sleeve 18 forwardly to position its locking flange 21 to seat the locking members 22 in the groove 13 and to lock them in that seated position.

While the locking members 22 may be of any type, I prefer that they be balls and that the member 6 be in the form of a hollow shell housing a ring 24 with the member 6 and the ring 24 being radially apertured to loosely confine the balls so that they may protrude to enter the groove 13 in their second position and still be exposed for engagement by the locking flange 21. A further advantage resulting from the use of balls for the locking members 22 is that the member 5 may be rotated relative to the member 6 thus ensuring, in use, that the hose 7 can not become kinked.

As will be apparent from Fig. 2, the retainer 15 is so spaced relative to the groove 13 that it seats on the extremity of the member 6 when the members 5 and 6 are coupled together thereby to provide a seal against air loss and preferably the head 12 is dimensioned relative to the member 6 so that, in the assembled coupling, its extremity is substantially flush with the flange 11.

From the foregoing, it will be apparent that couplings, in accordance with my invention, are well adapted to meet all requirements for they combine simplicity of construction and maximum ease of operation with security against accidental release and tightness against air leakage in use.

What I therefore claim and desire to secure by Letters Patent is:

1. A coupling for use in connecting a vacuum hose to a vacuum cleaner, said coupling comprising first and second tubular members to one of which said hose is to be connected and the other of which is to be connected to said cleaner, said first member including a pair of axially spaced retainers and a head dimensioned to fit freely within said second member and having an annular groove, a sleeve including a shoulder disposed between said retainers and an annular locking flange, a spring surrounding said first member and backed by the rearmost retainer to establish a slidable connection between said first member and said sleeve and engaging said shoulder to yieldably seat said shoulder against the foremost retainer to maintain said locking flange in an operative position, and a plurality of balls carried by said second member for radial movement between a first position in which they are spaced apart to receive said head and a second position in which they are entrant of said groove, said locking member holding said balls against movement towards their first position when in its operative position.

2. The coupling of claim 1 in which the foremost retainer constitutes a seat and the second member has an annular extremity engageable with the seat when said locks are entrant of the groove.

3. A coupling comprising first and second tubular members, said first member including a pair of fixed axially spaced and outwardly directed retainers and a head dimensioned to fit freely within said second member and having an annular groove, the foremost retainer being engageable with the received end of said second member, a sleeve slidable on said first member and including a shoulder disposed between said retainers and an annular locking flange, a spring surrounding said first member and backed by the rearmost retainer and engaging said shoulder to yieldably seat said shoulder against the foremost retainer to maintain said locking flange in an operative position, and a plurality of balls carried by said second member for radial movement between a first position in which they are spaced apart to receive said head and a second position in which they are entrant of said groove, said locking flange being dimensioned to receive the ball carrying end of said second member and overlying the groove and holding said balls against movement towards their first position when in its operative position.

4. A coupling comprising first and second tubular members, said first member including a pair of fixed axially spaced and outwardly directed retainers and a head dimensioned to slidably fit within the bore of said second member and having a recess intermediate the ends thereof, the foremost retainer being engageable with the received end of said second member, a sleeve slidable on said first member and including a shoulder disposed between said retainers and an annular locking flange, a spring surrounding said first member and backed by the rearmost retainer and engaging said shoulder to yieldably seat said shoulder against the foremost retainer to maintain said locking flange in an operative position, and a detent element carried by said second member for radial movement between a first position in which said detent is entirely outside the bore of said second member and projects outwardly of said second member to receive said head and a second position in which said detent is partially within said bore to enter said recess, said locking flange being dimensioned to slidably receive the detent carrying end of said second member and to overlie the recess and to hold said detent against movement towards its first position when in said operative position.

PAUL C. HOLTE.

References Cited in the file of this patent

UNITED STATES PATENTS

| Number | Name | Date |
|---|---|---|
| 921,691 | Friday | May 18, 1909 |
| 1,830,480 | Myers | Nov. 3, 1931 |
| 2,062,628 | Yannetta | Dec. 1, 1936 |
| 2,159,242 | Yanagi | May 23, 1939 |
| 2,413,730 | Samiran | Jan. 7, 1947 |
| 2,429,202 | Estill | Oct. 21, 1947 |
| 2,473,973 | Scheiwer | June 21, 1949 |